Oct. 20, 1970 J. H. DESSEN 3,535,475
DIFFERENTIAL TYPE TELEPHONE REPEATER CIRCUIT
Filed Nov. 22, 1968
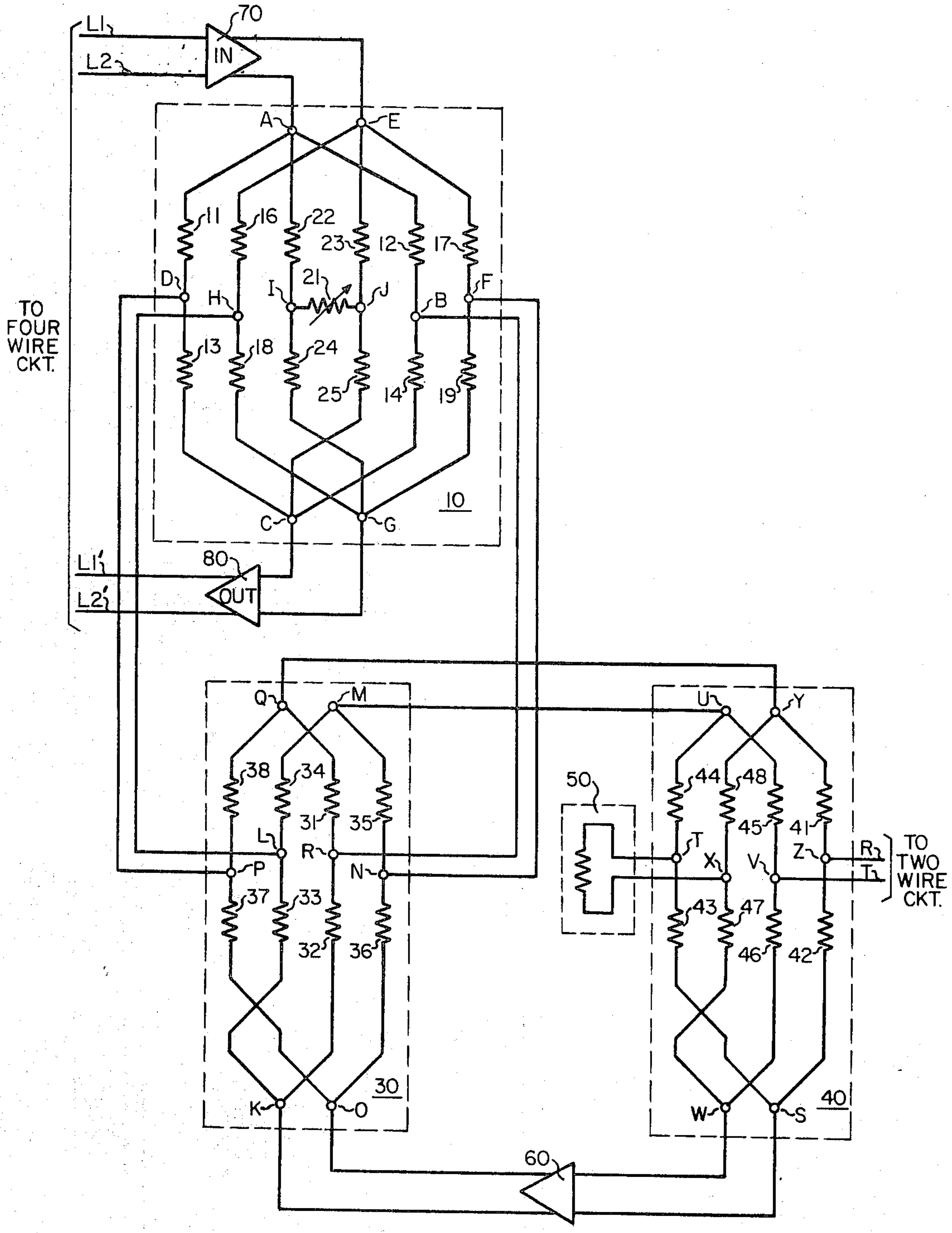
INVENTOR.
JOSEPH H. DESSEN
BY
AGENT

United States Patent Office 3,535,475

Patented Oct. 20, 1970

3,535,475

DIFFERENTIAL TYPE TELEPHONE REPEATER CIRCUIT

Joseph H. Dessen, 2601 Good Intent Road, P.O. Box 100, Blackwood Terrace, N.J. 08096

Filed Nov. 22, 1968, Ser. No. 778,203
Int. Cl. H04b *1/58*
U.S. Cl. 179—170 8 Claims

ABSTRACT OF THE DISCLOSURE

A telephone repeater circuit for connecting four-wire toll lines to two-wire local lines. Resistance hybrid circuitry operated on a differential basis provides a high echo return loss, independent of the two-wire line impedance.

BACKGROUND OF THE INVENTION

Field of the invention

The present invention pertains to telephone repeaters. More specifically the present apparatus is a repeater circuit arrangement employing resistance hybrids, to connect four-wire telephone facilities to two-wire facilities.

Most telephone toll or long line circuits operate on a four-wire basis. This permits the use of separate amplifiers for each direction of transmission. However, most local switching and local telephone lines are operated on a two-wire basis. At a junction of toll and local facilities, special circuitry is required to connect from four-wire circuits to two-wire circuits and vice versa.

Description of the prior art

Circuits referred to as hybrids are conventionally employed in joining two-wire to four-wire telephone circuits. These circuits usually take one of two forms; transformer hybrids or resistance hybrids.

In the usual arrangement the transmit and receive branches of a four-wire circuit are connected to opposite sides of the hybrid. One of the other connections will go to the two-wire line and the remaining to a balancing network. Ideally a hybrid should have infinite loss between opposite sides, providing complete isolation between the incoming and outgoing branches of the four-wire circuit. At the same time there should be no loss between adjacent arms. Such performance is never actually achieved. The actual isolation between transmit and receive branches of the four-wire line is called transhybrid loss. The undesired loss between the two-wire line and the four-wire line is called insertion loss.

If the transhybrid loss is too low, power from the receive branch of the four-wire line leaks across the hybrid to go out on the transmit branch, appearing at the other end of the four-wire line as an echo. This condition frequently requires the insertion of special circuits referred to as echo suppressors. A hybrid may also produce echoes by reflecting power back down the two-wire line. Such reflections occur at any impedance irregularity; that is, if the input impedance at the hybrid fails to match the characteristic impedance of the two-wire line. Under these conditions power is reflected rather than transferred through the connection. How much power is reflected, is dependent on the match between the two-wire line and the balancing network. The quality of this match is referred to as return loss.

As noted above, hybrids frequently assume two forms. A transformer type which is expensive to manufacture because of the high degree of similarity required between the several transformers employed, and the resistance type which, while inexpensive, dissipates power and thus causes considerable insertion loss. Neither type in conventional circuitry is able to compensate for variations which may exist in the impedance of the two-wire line to which they are connected.

SUMMARY OF THE INVENTION

The repeater circuit disclosed herein is useful for connecting four-wire toll telephone facilities to two-wire local telephone facilities. It consists of resistance hybrid circuitry combined with amplifiers to compensate for insertion loss, in a manner so as to obtain a high echo return loss, independent of the impedance match between the hybrid circuitry and a two-wire telephone line.

A first or splitting hybrid is employed to separate incoming and outgoing branches of a four-wire telephone facility. A second or line hybrid is connected to the two-wire telephone facility and a balancing network. Connected between the first two hybrids is a third or differential hybrid, which conducts signals between the splitting and line hybrids. A circuit path also extends from the two-wire line to an amplifier which amplifies the reflected signals resulting from a mismatch between the balancing network and the two-wire facility; and extends these amplified signals to the differential hybrid where they are combined with the actual signals on a differential basis to correct the reflection of signals coming from the two-wire facility.

BRIEF DESCRIPTION OF THE DRAWING

The accompanying drawing is a simplified schematic diagram of a telephone repeater in accordance with the present invention.

DESCRIPTION OF THE PREFERRED EMBODIMENT

Referring now to the drawing, the present invention comprises a differential type telephone repeater, connected between a four-wire telephone line, as is usually encountered in telephone toll circuits, and a two-wire circuit of the sort encountered in a local office connection to a local subscriber.

The present repeater consists of a splitting hybrid 10, connected through amplifiers 70 and 80 to a four-wire circuit as noted above. This splitting hybrid consists of a first resistance network, consisting of resistors 11 to 14 inclusive, connected at terminal A to incoming line conductor L2, and at terminal C to outgoing line conductor L1′; and a second resistance network consisting of resistors 16 to 19 inclusive, connected at terminal E to incoming line conductor L1, and at terminal G to outgoing line conductor L2′. Splitting hybrid 10 also includes a balancing network with cross arms, connected between the incoming and outgoing line conductors, consisting of potentiometer 21 and resistors 22 to 25 inclusive.

Included in the present repeater circuit is a differential hybrid 30, connected to the two resistance networks of splitting hybrid 10. Differential hybrid 30 is an eight terminal resistor lattice network, including resistors 31 to 38 inclusive.

Also included is a line hybrid 40, connected between differential hybrid 30, and the two-wire circuit termination referred to above. Line hybrid 40 is likewise an eight terminal resistance lattice network, including resistors 41 to 48 inclusive. Connected to line hybrid 40 at terminals T and X is a line balancing network 50, usually of 600 ohms impedance.

A return amplifier 60 is connected between hybrid 40 (terminals S and W) and hybrid 30 (terminals O and K). The detailed circuitry of amplifiers 60, 70 and 80 is not shown, since it may assume any well known form. Inexpensive, high gain transistor amplifiers are commercially available, and as such can be used in the present repeater circuit both effectively and economically.

The operation of the present repeater will be described with reference to the accompanying drawings, first as it functions in the receive mode.

Incoming voice or other A.C. signals are conducted from the four-wire circuit over line conductors L1 and L2, to the incoming or receive amplifier 70, where they are amplified to the proper level and then conducted to the splitting hybrid 10. The L1 conductor is connected to terminal E on the network consisting of resistors 16 to 19 inclusive; while the L2 conductor is connected to terminal A, on the network consisting of resistors 11 to 14 inclusive.

The principal current path from conductor L1 divides between resistors 16 and 17, with one connection extending from terminal H, to terminal L of the differential hybrid 30 with the other connection extending from terminal F to terminal N on hybrid 30. The split current paths extend through resistors 34 and 35, joining at terminal M. This path further extends to terminal U of hybrid 40, through resistor 45, and from terminal V to conductor T of the two-wire circuit.

In similar manner, the current path from conductor L2 divides between resistors 11 and 12, with one connection extending from terminal B to terminal R on hybrid 30, and the other connection extending from terminal D to terminal P on hybrid 30. These split signal paths extend through resistors 31 and 38, combining at terminal Q. The signal path further extends from terminal Q to terminal Y of hybrid 40, through resistor 41, and from terminal Z to conductor R of the two-wire line circuit.

It should be noted that signals from the terminals L and P are conducted through resistors 33 and 37, with cross arms to terminals K and O respectively. Likewise signals at terminals R and N, extend through resistors 32 and 36, without cross arms, to terminals K and O respectively. At this point, the two signals being of opposite polarity cancel due to the cross arms from resistors 33 and 37 to terminals K and O. Thus no opposition is present at terminals K and O to signals from amplifier 60.

Signals entering the line hybrid 40 at terminals Y and U are also conducted through resistors 48 and 44 respectively to the 600 ohm line balancing network 50.

As in the differential hybrid 30, signals of opposite polarity cancel at terminals S and W, with no signals reaching the input of amplifier 60, provided the two-wire line is a pure resistance and equal to the 600 ohm line balancing network 50.

Any mismatch between the impedances of the two-wire line and the line balancing network will unbalance the line hybrid 40, producing transhybrid currents. These currents are conducted from terminals S and W to the input of amplifier 60, where they are amplified and extended to terminals K and O of differential hybrid 30. The polarity and amplitude of these signals appearing at terminals K and O are such as to oppose any change in the signals coming from the splitting hybrid 10 to the differential hybrid 30, thus maintaining hybrid balance independent of the impedance of the two-wire line.

At the time of installation of a repeater constructed in accordance with the present invention, the splitting hybrid 10 is actually balanced by terminating terminals Z and V (the two-wire line terminals with a 600 ohm network), like network 50. The gain of amplifier 60 is then set at zero, and potentiometer 21 is adjusted to obtain maximum transhybrid loss between the incoming terminals A and E, and the outgoing terminals C and G of splitting hybrid 10.

The 600 ohm network across terminals Z and V is then removed. Terminals Z and V are then short circuited, or left open, and the gain of amplifier 60 is adjusted to balance hybrid 10. When this adjustment is complete, the two-wire line is connected to terminals Z and V, and the balance of hybrid 10 is independent of the two-wire termination.

Because amplifier 60 is selected to have low phase shift, and since no inherent phase shift exists in a resistance network, a high degree of isolation, and therefore high transhybrid loss is maintained between the input and output terminals of the splitting hybrid 10. With amplifier 60 included in the balance loop that extends from the line hybrid 40 to the differential hybrid 30, low phase shift must extend over the voice frequency range.

Operation of the present repeater in the transmit mode will now be described, with reference to the accompanying drawing.

Outgoing signals transmitted from the two-wire line are conducted through resistors 41 and 45 from terminals Z and V, and applied at terminals Q and M respectively, of hybrid 30. The same signals are also conducted through resistors 42 and 46, via terminals S and W respectively, to the input of amplifier 60. After amplification the transmit signals are conducted to terminals O and K or hybrid 30.

In a manner similar to that previously described, a differential action takes place in hybrid 30. Signals will add at terminals P and L, while they will cancel at terminals R and N.

The outgoing signals will be extended from terminals P and L to terminals D and H of the splitting hybrid 10, where they will be extended through resistors 13 and 18 to the outgoing amplifier 80. In amplifier 80 the signal will be amplified to the proper level and applied to the outgoing conductors L1′ and L2′, of the four-wire circuit. Since the incoming amplifier 70 is a one-way device, signals conducted through resistors 11 and 16 will not be conducted to incoming conductors L1 and L2.

It has been found in a practical embodiment of the present invention, constructed as described herein, that an inherent shift of five degrees in the amplifier 60 over the voice frequency range, resulted in a transhybrid loss measurement of 90 db. Insertion loss of the present repeater circuit, when in the receive condition (four-wire in to two-wire out) was found to be 30 db. Likewise when in the transmit mode (two-wire in to four-wire) a similar 30 db loss was found. The total insertion loss thus being 60 db. When this value is subtracted from the transhybrid loss, an echo return loss of 30 db, independent of the two-wire impedance is provided.

By way of comparison, it was also determined that a phase shift of two degrees in amplifier 60, provided a transhybrid loss of 100 lb. The resultant echo return loss being 40 db under these conditions, also independent of the two-wire termination.

Modifications of the structure set forth in the preceding description, without departing from the principles presented are possible. Such modifications would thus fall fully within the scope of the present invention.

What is claimed is:

1. In a communication system, a four-wire transmission circuit, a line balancing network of fixed impedance, a two-wire transmission circuit having an impedance different from said network impedance, and a repeater for coupling signals between said transmission circuits, said repeater comprising: a first hybrid circuit connected to said four-wire transmission circuit; a second hybrid circuit connected to said two-wire transmission circuit, and connected to said line balancing network; a third hybrid circuit connected between said first hybrid circuit and said second hybrid circuit; signals received from said four-wire transmission circuit conducted sequentially through said first third and second hybrids, to said two-wire transmission circuit and to said balancing network; signals reflected from said two-wire transmission circuit to said second hybrid circuit, resulting from the difference in impedance between said two-wire circuit and said balancing network, said second hybrid circuit conducting said reflected signals directly to said third hybrid; and means comprising a circuit path further conducting said reflected signals from said second hybrid to said third hybrid in phase opposition to said reflected signals conducted directly to said third hybrid, whereby said reflected signals are cancelled in said third hybrid, preventing conduction of said reflected signals from said third hybrid to said first hybrid, and to said four-wire circuit.

2. A repeater as claimed in claim 1 wherein: said hybrid circuits each comprise a plurality of resistors.

3. A repeater as claimed in claim 1 wherein said means comprising a circuit path for further conducting said reflected signals from said third hybrid to said second hybrid in phase opposition to said reflected signals conducted directly to said hybrid, include: amplifier means.

4. A repeater as claimed in claim 1 wherein: a plurality of amplifiers are connected between said four-wire transmission circuit and said first hybrid circuit.

5. A repeater as claimed in claim 1 wherein said first hybrid further includes a balancing network connected to said four-wire transmission circuit.

6. A repeater as claimed in claim 5 wherein said balancing network comprises a plurality of resistors including at least one variable resistor.

7. A repeater as claimed in claim 1 wherein said first hybrid circuit includes a plurality of resistance bridges.

8. A repeater as claimed in claim 1 wherein said line balancing network has an impedance equivalent to the nominal impedance of said two-wire transmission circuit.

No references cited.

KATHLEEN H. CLAFFY, Primary Examiner

W. A. HELVESTINE, Assistant Examiner

U.S. Cl. X.R.

179—170.2